J. LEDERER.
EYEGLASS CLEANER.
APPLICATION FILED SEPT. 15, 1911.
1,018,430.
Patented Feb. 27, 1912.
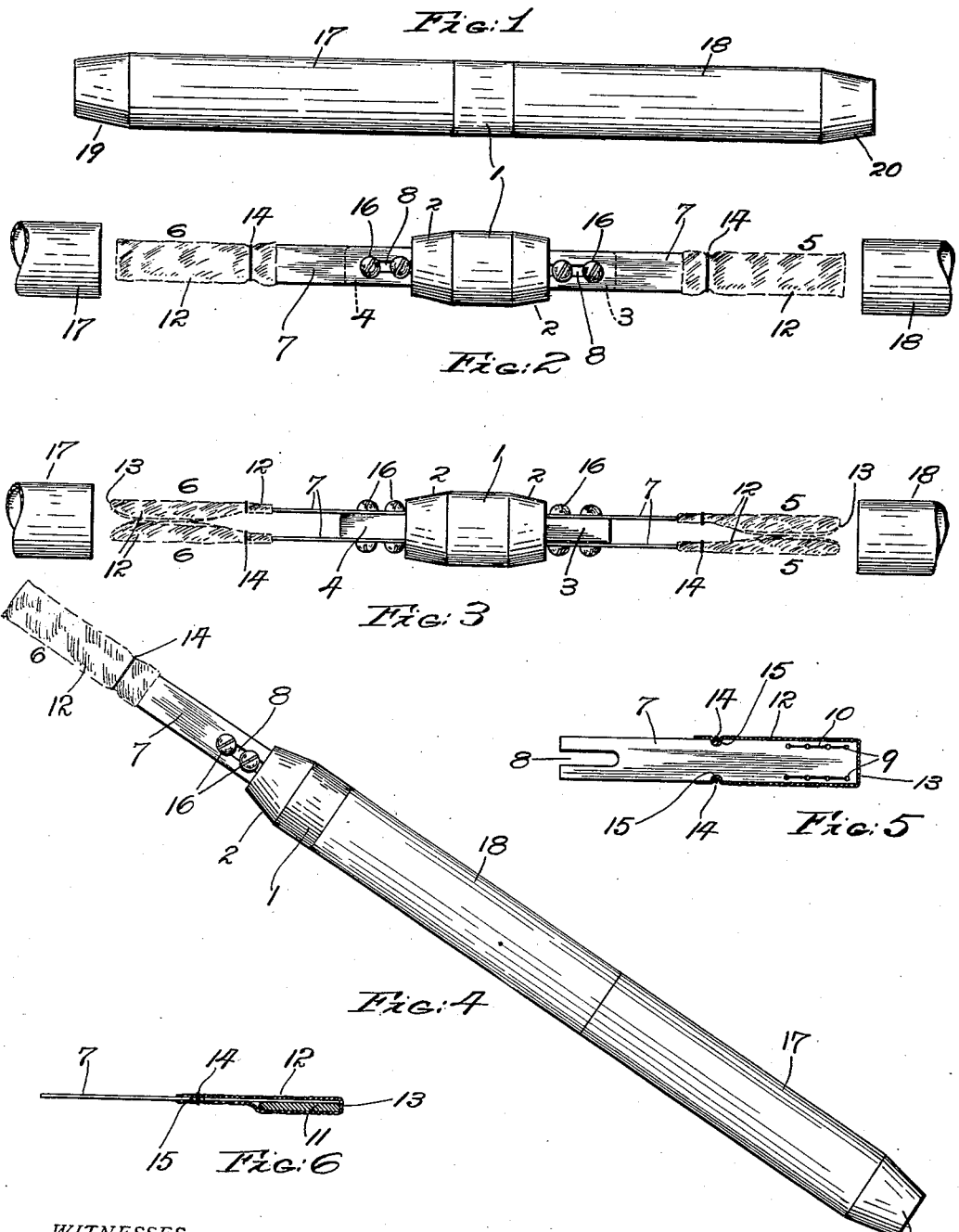
WITNESSES:
INVENTOR.
John Lederer.
BY
William J. Jackson
ATTORNEY.

UNITED STATES PATENT OFFICE.

JOHN LEDERER, OF PHILADELPHIA, PENNSYLVANIA.

EYEGLASS-CLEANER.

1,018,430.  Specification of Letters Patent.  Patented Feb. 27, 1912.

Application filed September 15, 1911. Serial No. 649,458.

*To all whom it may concern:*

Be it known that I, JOHN LEDERER, a citizen of the United States, residing at Philadelphia, in the county of Philadelphia and State of Pennsylvania, have invented a certain new and useful Eyeglass-Cleaner, of which the following is a specification.

The principal object of the present invention may be said to reside in the providing of a compact, efficient and comparatively inexpensive eye glass cleaner, the parts of which are detachable and interchangeable.

A further object of the present invention resides in the providing of an eye glass cleaner, particularly adapted for the use of mechanics, which may be readily carried in the vest pocket.

A still further object of the present invention is to provide a two-part eye glass cleaner of which one part is designed to carry a cleansing device and the opposite end of which is designed to carry a polishing device.
Other objects of the present invention reside in the providing of general details of construction and arrangement of parts to be hereinafter more specifically set forth.

The invention consists of the improvements hereinafter more fully described and finally claimed.

The nature, characteristic features and scope of the invention will be more fully understood from the following description taken in connection with the accompanying drawings forming part hereof and in which:

Figure 1, is an exterior view of the complete eye glass cleanser, Fig. 2, is a view in elevation illustrating the casing parts partially removed to illustrate the two-part cleanser, Fig. 3, is a top or plan view. Fig. 4, is a view in side elevation illustrating the eye glass cleaner ready for use and Figs. 5, and 6, are respectively a plan view partly sectioned and a side elevational view partly sectioned of one of the detachable wipers.

The device is designed to be incased, and exteriorly considered, much resembles a fountain pen casing and may be readily carried in the vest pocket. Generally speaking the eye glass cleanser comprises a two-part device of which one part is equipped with a glass cleanser and the other part with a glass polisher. In the specific embodiment of the invention illustrated in the drawings, there is shown an eye glass cleanser constructed along the lines best known to me at this time. In the drawings there is shown a short cylindrical body 1, having tapered ends 2, said tapered ends 2, terminating in flat sided extensions 3, and 4.

In practice good results have been obtained by constructing the body 1, and its complemental extensions 3, and 4, of hard rubber, although, of course, other materials may be used but hard rubber is preferable on account of its lightness. The extensions 3, and 4, each detachably carry a pair of wipers 5, and 6. For the sake of illustration the pair of wipers 5, may constitute glass cleansers and to this end may have been dipped in alcohol or other suitable material. Likewise, the pair of wipers 6, carried by the extension 4, may constitute glass polishers and may either be of plain cotton, linen, felt or other material or if desired may be treated with material suitable for polishing glass. Referring now more particularly to Figs. 3, 5, and 6, a description will be given of one of the wipers, it being understood that all of the wipers are similarly constructed. In this connection, use is made of a flat spring arm, one end of which is slotted as at 8, for a purpose to be presently described and the opposite end of which is marginally perforated as at 9.

Secured to the perforated end of the spring arm 7, shown in the drawings by means of stitches 10, which pass through the perforations 9, is a relatively thick cushion-like piece of material 11, which may be felt or the like. Totally enveloping the cushion 11, and the perforated end of the spring arm 7, is a piece of cotton, linen or other suitable fabric 12, which for the sake of illustration may be wrapped around the spring arm 7, and folded over upon itself to provide a closed end 13, and the free ends tied to place as at 14. In this connection, it may be remarked that the spring arm 7, is marginally notched as at 15, see Fig. 5, in order that the tying threads or cords will not slip when the wipers are reciprocated back and forth over the lens of an eye glass. The wipers thus constructed are detachably secured in pairs to the extensions 3, and 4, of the body 1. The slotted ends 8, of the wipers are accommodated and secured to place upon the flat sides of the extensions by means of screws 16. In this connection, it may be here stated, that the cushions 11, of the respective wipers face each other when in position upon the assembled device. In practice the inner faces of the respective pairs of wipers abut and as the arms 7, are resilient, obviously when a lens of an eye glass is inserted therebetween, said wipers frictionally engage the lens, so that said lens may be readily cleansed by one end of the device and polished when between the wipers of the opposite end of the device. To prevent dust and dirt from reaching the wipers and also to provide convenient means for handling and carrying the cleanser, use is made of a two-part casing of which one part is designated 17, and the other part 18. The open ends of the casing parts 17, and 18, are adapted to fit over the tapered ends 2, of the body 1, to form a dust tight joint, see Fig. 1, the closed ends of the casing parts 17, and 18, are tapered as at 19, and 20. Thus, for the sake of illustration, if the polishing end 6, of the device is being used the casing part 17, may be first removed and then its open end placed over the tapered end 20, of the casing part 18, to provide an elongated handle, see Fig. 4. Obviously, if the cleansing end 5, of the device were being used a reversal of the casing parts would be effected.

Having now particularly described the nature and objects of the invention, what I claim is:

1. A wiper for eye glass cleaners comprising a spring arm one end of which is slotted and the other end of which is marginally perforated said member being marginally notched intermediate its ends, a pad or cushion stitched to the perforated end of said member, a covering of cloth or the like enveloping said pad and perforated end of said member and a tying cord for securing the free ends of said cloth said tying cord being accommodated by said notches to prevent slippage.

2. An article of the class described comprising a body portion terminating in a flat sided extension, a pair of spring arms carried by said extension each arm having a slotted and a perforated end each arm being provided intermediate its ends with marginal notches, set screws for detachably securing the slotted ends of said arms with respect to said extensions, and a wiper for each arm, adjacent faces of said wipers abutting, each wiper comprising a pad stitched to the perforated ends of the arms and having a covering enveloping the pad and perforated end of the arm, the free end of said covering being secured to place by a tying cord, said cord being accommodated by said notches to prevent slippage.

In testimony whereof, I have hereunto signed my name.

JOHN LEDERER.

Witnesses:
AGNES E. CASKEY,
WILLIAM J. JACKSON.

---

Copies of this patent may be obtained for five cents each, by addressing the "Commissioner of Patents, Washington, D. C."